3,108,348
LINING OF PIPES INCLUDING LINING MACHINE WITH BELT DRIVE TROWELS
Herbert C. Schultz, Wyckoff, N.J., assignor, by mesne assignments, to Raymond International Inc., New York, N.Y., a corporation of New Jersey
Filed May 4, 1960, Ser. No. 26,880
Claims priority, application Great Britain July 31, 1959
7 Claims. (Cl. 25—38)

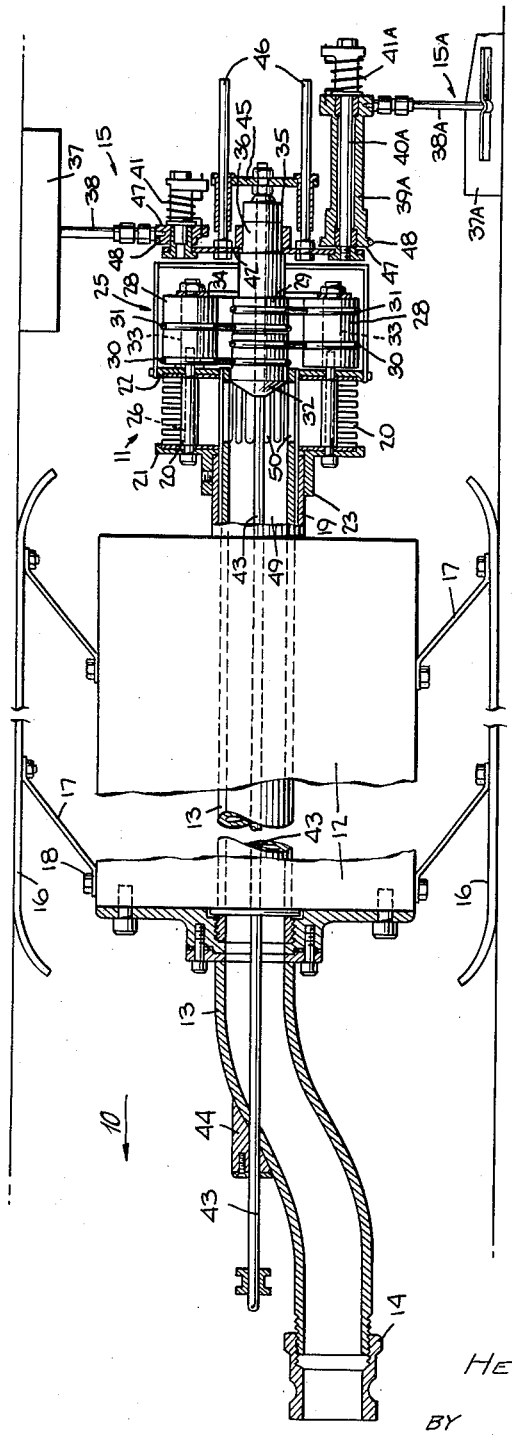

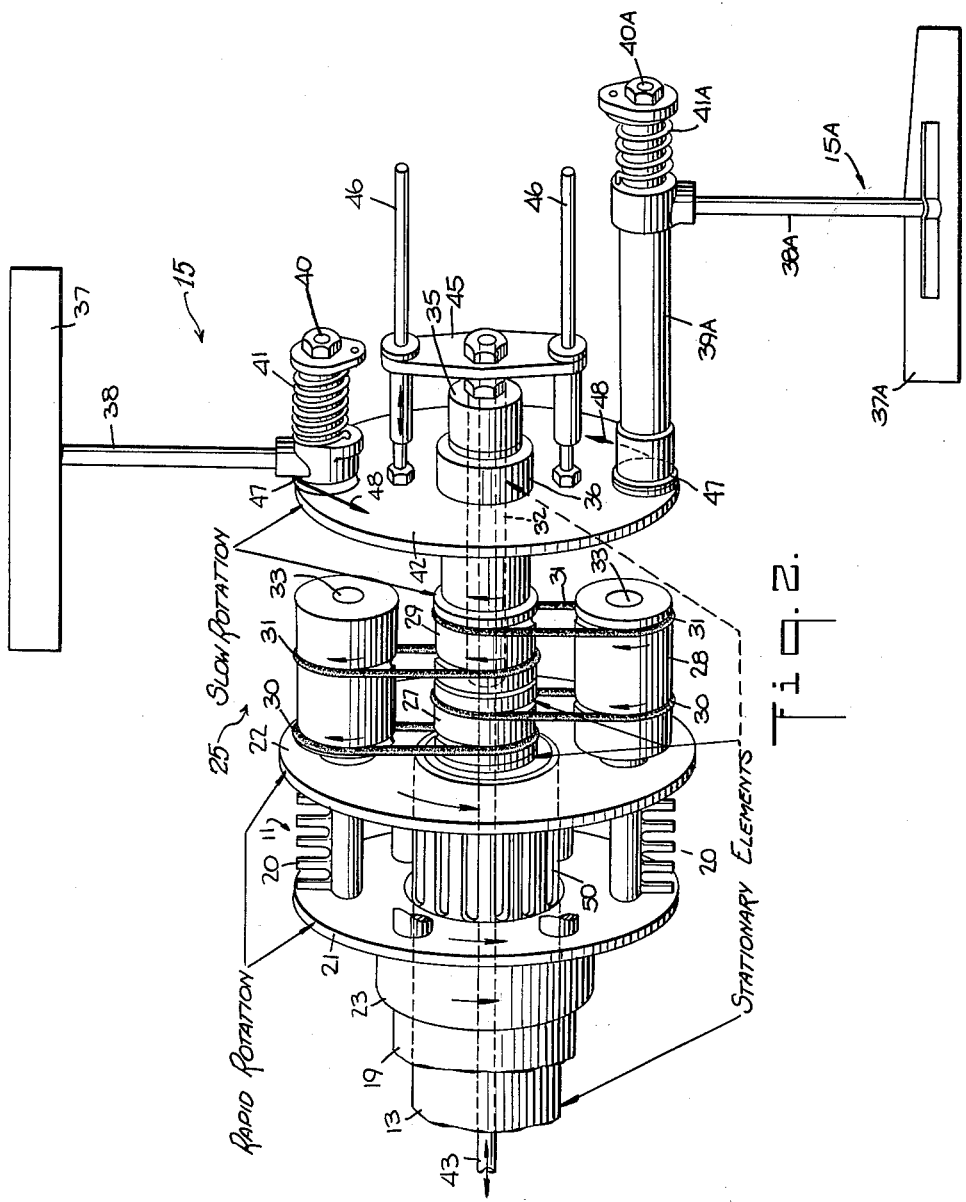

The present invention relates to a machine for the application of inert lining and, in particular, cementitious lining to pipes and, in particular, to pipes of relatively small diameter.

It is already well-known to apply a lining to the internal surface of a large diameter pipe by spraying cement-mortar onto it from a rotating head. In the known process the head is slowly progressed through the pipe on a wheeled carriage, leaving a cement-mortar coating behind it, and this may be smoothed by one or more slowly rotating trowel members, which, since the machine moves backwards through the pipe, follow close behind the rotating head. The application of the mortar to the wall of the pipe has usually been effected by forcing the plastic mortar through a pipe co-axial with the head and having a number of parallel longitudinal slots therein through which the mortar issues. The mortar is then thrown outwards by means of a rapidly rotating head comprising a number, for example, twenty-four, radially placed plates held in end discs. These plates preferably have slotted edges.

This machine has been used with excellent results to line large diameter pipes, for example 16 inches and upwards, but the size of machine employed has been too great for the lining of smaller diameter pipes. It has also been proposed to line pipes down to small diameters such as 4 to 6 inches by towing a skid-mounted body carrying a rotating head through the pipe, but difficulty has been encountered in providing a satisfactory trowel member drive in apparatus of this size and in practice no trowel member has heretofore been employed in machines of that size.

It is an object of the present invention to provide a machine which is capable of lining pipes of relatively small diameters, such as from 8 to 14 inches, and which includes at least one rotating trowel member for something the lining.

According to the present invention, a machine for applying a lining of inert material and, in particular, a cementitious material to a pipe, is arranged to be progressed through the pipe and comprises a rotatable distributor head, motor means for rotating the head at high speed, a conduit for receiving fluent lining material from a source outside the pipe and arranged to feed the material to the head, at least one trowel member arranged to rotate slowly to effect smoothing of the lining, and speed reducing drive means arranged to receive a high speed drive from the motor means and transmit a slow speed drive to the trowel member or members, said drive means comprising a stationary sun spool, an output sun spool axially aligned with the stationary sun spool, and at least one planet spool rotatably mounted on a spindle which is arranged to be driven by the motor means around said sun spools, one part of the planet spoon being drivingly connected with the stationary sun spool by a first endless member and another part of the planet spool being drivingly connected with the output sun spool by a second endless member, so that as the spindle is rotated around the sun spools at high speed the planet spool is rotated on the spindle by said first endless member and the output sun spool is rotated at slow speed by said second endless member to drive the trowel member or members.

Preferably, a pair of planet spools is provided, the planet spools being mounted on spindles on opposite sides of the sun spools and each spool having an endless belt drive connection with the stationary sun spool and with the output sun spool.

Preferably also, said spindle or spindles extend rearwardly from the rear part of the rotatable distributor head on which the spindle or spindles are mounted.

An embodiment of the invention will now be described, by way of example, with reference to the accompanying drawings.

In the drawings:

FIG. 1 is a fragmentary and largely sectional elevation of a machine for applying a cementitious lining to pipes of relatively small diameter.

FIG. 2 is a perspective view showing the interrelationship of the stationary sun spool, output sun spool, planet spool, motor means, distributor head, and trowel means.

Referring to the drawings, the machine is arranged to be progressed in the direction of arrow 10 through a pipe to which a cement-mortar lining is to be applied, by means of a tow-cable (not shown) wound onto a winch outside the pipe. The machine comprises a distributor head 11 which is rotated at high speed by an electric motor 12 and to which fluent cement-mortar lining material is fed through a conduit or pipe 13. The cement-mortar is supplied under pressure from a source outside the pipe being lined, through a flexible pipe (not shown) to a connector 14 at the inlet end of pipe 13.

On reaching the head 11 the cement-mortar is thrown outwardly to line the pipe and the lining is then smoothed by two slowly-rotating trowel members 15 and 15A.

The machine has a generally cylindrical-shaped body and four hardened runners or skids indicated at 16 are mounted on springs 17 and are secured to the body by means of metal bands 18. The skids engage the unlined pipe wall to maintain the machine substantially coaxial within the pipe.

The distributor head 11 is driven directly through a hollow drive shaft 19 from the electric motor 12 which is of the synchronous type having its field coils arranged concentrically around the pipe 13. The head 11 comprises a series of radial plates 20 having slotted outer ends and being clamped between end plates 21 and 22. The plate 21, which extends forwardly as a socket 23 in which drive shaft 19 is fixed, and the plate 22 which forms the front wall of casing 24 of a speed reducing drive unit 25, are urged together by means of bolts 26.

The trowelling members are driven through the unit 25 by the rotating head 11 which in this respect functions as part of a direct drive from the motor 12 to the unit 25. The unit comprises a grooved stationary sun wheel or spool 27, a pair of grooved planet wheels or spools 28 and a grooved output sun wheel or spool 29. A pair of endless belts 30 are arranged around spool 27 and the front parts of spools 28, and a pair of endless belts 31 provide a drive between the rear parts of spools 28 and spool 29. Spool 27 is bolted to an annular member 32 which is welded to and extends rearwardly of the rear end of pipe 13. The spools 28 are rotatably mounted on spindles 33 carried by extensions of bolts 26 and rigidly interconnected by an annular member 34 which, with the plate 22, functions as a cage for the planet spools. The output spool 29 is rotatably mounted on the rearward extension 35 of the member 32 and itself extends rearwardly through the casing 24 as a hub 36 on which the trowel members 15 and 15A are supported.

In operation, as the distributor head 11 and the cage are rotated, the planet spools move bodily around the sun spools and due to the action of the belts 30 the spools 28 also rotate on spindles 33. As shown in the drawing, the sun spools are of the same diameter and the planet spools are of uniform diameter. Thus, if no belt slip occurred, the output sun spool 29 would remain stationary as the rotating planet spools connected thereto by belts 31 move around the spool 29. However, the effective diameters of the spools are predetermined to effect speed reduction from a motor speed which may be in the region of 1750 r.p.m. to an output spool rotation which may be from 2 to 30 r.p.m. For instance the sun spool 29 may have a diameter greater than that of the sun spool 27 and the planet spools may have their rear parts which are in engagement with belts 31 of a diameter greater than that of their front parts which are in engagement with belts 30. Also, belt slip does occur and this slip is utilized to influence the speed reduction. The belt slip is of advantage as it may occur before breakage of a part when a trowel member contacts an obstruction.

The trowel members 15 and 15A comprise trowel blades 37 and 37A mounted on arms 38 and 38A. The arms extend outwardly from spring-urged hubs 39 and 39A which are mounted in spindles 40 and 40A. It will be noted that hub 39A is elongated to stagger the blades and so give a greater length of trowelling action in one revolution of the trowel members. The spindles carry helical springs 41 and 41A which act to urge the hubs to turn to move the blades outwardly and are mounted on a plate 42 which is fixed to and extends radially from hub 36.

An arrangement for controlling the radial displacement of the trowel blades includes a control rod 43 which extends axially through the machine and is mounted for longitudinal sliding movement. The rod 43 extends through a sealing housing 44 into the pipe 13 and extends rearwardly through the pipe to pass through the annular member 32 which with the rod forms an end plug for pipe 13. At its rear end the rod is bolted to a control plate 45 which is slidable on guides 46 bolted to plate 42.

The forward ends of the hubs 39 and 39A are formed as pulleys 47 to which the one ends of cables 48 are fixed. The cables extend inwardly over pulleys (not shown) fixed to the plate 42 and rearwardly to have their other ends secured to control plate 45. Thus, if the control rod is actuated to move the control plate rearwardly, i.e. to the right as shown in the drawing, the cables 48 will unwind a corresponding length from the pulley 47 to effect angular displacement of the trowel members against the action of springs 41 and 41A. This angular displacement results in a displacement of the trowel blades in an inward direction with respect to the machine axis.

In operation of the machine, fluent cement-mortar is supplied to the connector 14 and is fed rearwardly passing along the annular channel 49 which exists between the inner face of pipe 13 and the rod 43. On reaching the rear end of pipe 13 the cement-mortar flows through slots 50 in the pipe to reach the distributor head 11 which is rotating at high speed. The cement-mortar is thrown outwardly to form a lining on the pipe through which the machine is being progressed, and the freshly applied lining is then smoothed by the slowly rotating trowel blades which are adjustable as described above to control the trowelling pressure or to retract the blades when for instance, the machine is to be removed from the pipe.

The trowel members, being resiliently mounted, are self-adjusting with respect to irregularities in the bore of the pipe being lined, thus promoting uniformity in the thickness of the lining. Also, the machine may be progressed through line valves and slow bends and past lateral connections without involving the undesirable deposition of excess cement-mortar such as would tend to occur if a non-rotary trowel of the tapering skirt type were to be used.

The invention provides a machine for applying a smoothed lining to pipes of relatively small diameter, the machine described above being intended for use in pipes having diameters within the range 8 to 14 inches.

The lining is described above as cementitious, but other lining material which is virtually inert to the fluid which will flow through the pipe may be used.

What is claimed and desired to be secured by Letters Patent is:

1. A machine for applying a lining of inert material and, in particular, a cementitious material to a pipe, the machine being arranged to be progressed through the pipe and comprising a rotatable distributor head, motor means for rotating the head at high speed, a conduit for receiving fluent lining material from a source outside the pipe and arranged to feed the material to said head, trowel means arranged to rotate slowly to effect smoothing of the lining, and speed reducing drive means arranged to receive a high speed drive from said motor means and transmit a slow speed drive to said trowel means, said drive means comprising a stationary sun spool, an output sun spool axially aligned with said stationary sun spool, and at least one planet spool rotatably mounted on a spindle, means drivingly connected to said motor means and positioned at the rear of said distributor head for mounting said spindle and planet spool for planetary motion around said sun spools, one part of said planet spool being drivingly connected with said stationary sun spool by a first endless member and another part of said planet spool being drivingly connected with said output sun spool by a second endless member, at least one of said driving connections being provided with a predetermined amount of slippage, so that as said spindle is rotated around said sun spools at high speed said planet spool is rotated on said spindle by said first endless member and said output sun spool is rotated at slow speed by said second endless member to drive said trowel means.

2. A machine as claimed in claim 1, in which the diameters of said stationary sun spool and said output sun spool are different one from the other to cause rotation of the latter.

3. A machine as claimed in claim 1, in which the diameters of said one part of the planet spool and said other part of the planet spool are different one from the other to cause rotation of the output sun spool.

4. A machine as claimed in claim 1, in which a pair of planet spools is provided, the spools being mounted on spindles on opposite sides of the sun spools and each spool having an endless belt drive connection with the stationary sun spool and with the output sun spool.

5. A machine as claimed in claim 1 in which said spindle extends rearwardly from the rear part of the rotatable distributor head on which the spindle is mounted.

6. A machine as claimed in claim 5, in which the distributor head comprises a series of radial plates clamped between end plates and arranged round the rear end of said conduit which is arranged axially of the machine and is formed at said rear end with slots for passage of lining material to the distributor head, and a support member extends rearwardly from the rear end of the conduit to carry said stationary spool and act as a spindle for said output sun spool which extends rearwardly to carry a pair of trowel members.

7. A machine as claimed in claim 6, in which a slidable rod for controlling the radial displacement of the trowel member extends axially through the machine, passing through said conduit and through said support member.

References Cited in the file of this patent

UNITED STATES PATENTS

| | | |
|---|---|---|
| 2,399,321 | Butler | Aug. 30, 1946 |
| 2,484,018 | Crom | Oct. 11, 1949 |
| 2,704,873 | Kirwan | Mar. 29, 1955 |